United States Patent [19]

Bishop

[11] Patent Number: 5,104,462
[45] Date of Patent: Apr. 14, 1992

[54] SCANNING INDUCTION HARDENING PROCESS BY USING RADIALLY MOVING INDUCTION COIL

[75] Inventor: Arthur E. Bishop, Sydney, Australia

[73] Assignee: A.E. Bishop & Associates Pty. Limited, New South Wales, Australia

[21] Appl. No.: 459,703

[22] PCT Filed: Feb. 13, 1989

[86] PCT No.: PCT/AU89/00059
§ 371 Date: Feb. 27, 1990
§ 102(e) Date: Feb. 27, 1990

[87] PCT Pub. No.: WO90/09458
PCT Pub. Date: Aug. 23, 1990

[51] Int. Cl.$^5$ .............................................. C21D 1/10
[52] U.S. Cl. ................................... 148/128; 148/150; 148/154; 148/152; 219/10.43; 219/10.79
[58] Field of Search ............... 148/128, 130, 154, 150, 148/152; 219/10.43, 10.57, 10.59, 10.79, 10.77

[56] References Cited

U.S. PATENT DOCUMENTS 4,181,846  1/1980  Cunningham .................... 219/10.57
4,538,041  8/1985  Budzinski ......................... 219/10.67

FOREIGN PATENT DOCUMENTS

89/01529  8/1989  PCT Int'l Appl. .

Primary Examiner—R. Dean
Assistant Examiner—Sikyin Ip
Attorney, Agent, or Firm—Hill, Van Santen, Steadman & Simpson

[57] ABSTRACT

A scanning induction hardening process in which a steel workpiece is surface hardened by progressively traversing its length with an inductor coil energized by an alternating electric current and immediately thereafter quenching the heated portion of the workpiece straightening of bends in the workpiece being surfaced hardened being controlled during the induction hardening process by monitoring the straightness of the workpiece and utilizing information thereby obtained to control the heating and quenching of the workpiece is such a manner that a layer of hardened material of greater thickness is formed on the concave side of any bend in the workpiece such as to produce a straightening moment acting to remove the bend characterized in that the inductor coil is shaped to heat only a portion of the circumference of the work piece, or shaped to concentrate more heat in one portion of the circumference, and the speed of rotation of the work piece is varied to allow the concave side of the work piece to remain in the concentrated heating area longer, and thus, upon quenching, to receive a deeper martenistic layer on this side.

2 Claims, 7 Drawing Sheets

SCANNING INDUCTION HARDENING PROCESS BY USING RADIALLY MOVING INDUCTION COIL

BACKGROUND OF THE INVENTION

This invention relates to the process for surface hardening of a steel workpiece by progressively traversing its length with an inductor coil and immediately juxtaposed thereto, a quench spray device. The surface layers of the workpiece are heated to about 1,000° C. and upon quenching, are transformed to the martensitic phase. Martensite provides high surface hardness and enhanced resistance to fatigue. In an alternative version of the process the steel workpiece is sometimes totally immersed in a bath of quenching fluid. The heat generated by the induction coil vapourises the fluid in the localised region of heating, thereby preventing quenching until the inductor coil has traversed away from this region, upon which the quenching fluid makes contact with the heated region of the workpiece and hardening occurs.

The process is frequently referred to as "Scanning Induction Hardening". The inductor coil is typically a single turn (or part of a turn) of heavy section copper conductor surrounding the work, incorporating water passages for cooling, and is supplied by a low voltage, high frequency, alternating current. Usually, the coil remains stationary, and the workpiece is moved during hardening. It is, however, quite feasible for the coil to be moved and for the workpiece to remain stationary. The taken to refer both to movement of the coil and of the workpiece.

Where the workpiece is circular in cross-section, it is usually rotated between centres so as to distribute the hardening uniformly around the periphery which might otherwise be uneven because of small asymmetries of heating due to coil construction or small irregularities in the quench ring. Such an arrangement is disclosed in U.S. Pat. No. 3,525,842, except that the inductor, in this case, does not surround the workpiece.

According to the invention, a method is provided of straightening a workpiece during such hardening operation whether the bending is in the workpiece initially or results from the hardening operation.

It frequently happens that workpieces bend during induction hardening due to the release of longitudinal stresses resulting from previous straightening operations which have taken place at earlier stages of manufacture of the workpiece or even when the original bar material was manufactured. The induction heating releases only the stresses in the outer layers or "case", so that the residual longitudinal stresses in the core cause the workpiece to bend.

Various methods of overcoming this problem have been devised, for example in U.S. Pat. No. 3,988,179 shafts, or axles, are hardened in a carousel device whereby the workpieces have their outer case layers heated by a single shot inductor at one station and then moved to a second station where a ram or series of rams is brought to bear on the red hot workpiece in order to straighten it prior to quenching. Such an approach has the advantage that it corrects any bending which results from the relieving of stresses in the outer case during the heating phase, but has the serious flaw that it does not provide for further bending which occurs during the quenching of the workpiece. This shortcoming of the prior art is overcome by the present invention, which avoids the application of correcting forces by physical contact between the straightening apparatus and the workpiece. The risk of inducing stress cracks, as with these existing methods, which bend the component is thus substantially eliminated.

Thus during the quench, the martensitic phase material which is formed in the case layers undergoes a volumetric change of about 2 or 3%, so that the outer layer is left in compression and, in consequence, the core material is left in tension. Now if, for any reason, the depth of the hardened layer (typically 1.5 mm for a shaft about 25-30 diameter) is deeper on one side than the other, then the compressive stresses in the case layers will be offset from the tension stresses in the core and so bending occurs. The bending will always be such that the convex side of the workpiece is associated with that side having the thickest martensitic case.

SUMMARY OF THE INVENTION

In practice, eccentricity of depth of case results from the proximity heating effect, that is, the greater heating of the workpiece where the clearance between the workpiece and the inductor coil is least. This effect varies non-linearly. Such eccentricity may result from an initial bend of a workpiece, the eccentricity of centres, or due to bending of the workpiece during hardening. It follows that initial bend of the workpiece will tend to increase in such conventional scanning induction hardening.

In the invention hereinafter referred to as the first invention described in the specification of application PCT/AU88/00302 the contents of which are incorporated in this specification, the phenomenon of bending during hardening due to differences in depth of the martensitic layer is utilized to overcome distortions which occur during hardening and, in addition, to correct any initial bends in the workpiece, so that a workpiece, initially bent will leave the hardening operation substantially straight.

The first invention consists in a scanning induction hardening process in which a steel workpiece is surface hardened by progressively traversing its length with an inductor coil energised by an alternating electric current and immediately thereafter quenching the heated portion of the workpiece characterised in that straightening of bends in the workpiece being surfaced hardened is controlled during the induction hardening process by monitoring the straightness of the workpiece and utilising information thereby obtained to control the heating or quenching or both heating and quenching of the workpiece in such a manner that a layer of hardened material of greater thickness is formed on the concave side of any bend in the workpiece such as to produce a straightening moment acting to remove the bend.

Since the making of the first invention it has been realised that if the inductor coil is shaped to heat only a portion of the circumference of the work piece, or shaped to concentrate more heat in one portion of the circumference, and the speed of rotation of the workpiece is varied this will allow the concave side of the workpiece to remain in the concentrated heating area longer, and thus, upon quenching, to receive a deeper martenistic layer on this side.

The present invention thus consists in a scanning induction hardening process in which a steel workpiece is surface hardened by progressively traversing its length with an inductor coil energised by an alternating electric current and immediately thereafter quenching the heated portion of the workpiece, straightening of bends in the workpiece being surfaced hardened being controlled during the induction hardening process by monitoring the straightness of the workpiece and utilising information thereby obtained to control the heating or quenching or both heating and quenching of the workpiece in such a manner that a layer of hardened material of greater thickness is formed on the concave side of any bend in the workpiece such as to produce a straightening moment acting to remove the bend characterised in that the inductor coil is shaped to heat only a portion of the circumference of the work piece, or shaped to concentrate more heat in one portion of the circumference, and the speed of rotation of the workpiece is varied to allow the concave side of the workpiece to remain in the concentrated heating area longer, and thus, upon quenching, to receive a deeper martenistic layer on this side. The treatment of non-circular section work pieces can be facilitated by moving the induction coil radially to the work piece axis while varying the speed of rotation of the work piece.

The method of the first invention may be applied to situations where the workpiece is not cylindrical in the area to be hardened, and a non-circular inductor coil is used. This makes it impossible to rotate the workpiece during hardening. The necessary offsetting of the coil and/or quench ring during the traverse of the workpiece will therefore be produced by offsetting in one direction or the other according to the distortion occurring as the workpiece moves through the coil, generally vertically downwards. According to the first invention in such cases, two probes contact the workpiece just above the coil. They are placed in planes at right angles to each other to sense distortion in any direction. Any initial bends in the workpiece must be recorded prior to the commencement of hardening either at a separate inspection station or by recording the movements of the two probes as the workpiece moves past the probes prior to hardening, when the workpiece moves from the loading position to the highest position where hardening commences. The offsetting used will be that predicted from calculations based on the original shape of the workpiece as recorded, modified continuously by the requirements of compensating for distortion occurring during hardening.

In cases where a workpiece is cylindrical, it is desirable to rotate it to give most uniform hardening, and hence, in order to accomplish straightening while hardening, the coil and/or quench ring must orbit with respect to the workpiece so as to maintain the desired offsetting between the coil and workpiece axes synchronously as the workpiece rotates. A single probe in contact with the workpiece will be sufficient to provide information as to any bending, and an angular transducer incorporated in the rotational drive will give the remaining information needed in order to perceive the orientation of the distortion. As in the case of non-circular workpieces, the offsetting will be the sum of that needed to correct initial bends plus that needed to correct for hardening distortion.

Generally, a fairly wide tolerance is allowed on the depth of hardening, for example, in the case of a hardened layer of 1.5 mm being specified, a variation of depth of hardened layer of between 1 and 2 mm is usually acceptable. This difference of depth is generally sufficient to straighten slightly bent shafts or to overcome moderate levels of residual stresses if the method advocated in this invention is used.

The difference of depth of heating will generally be produced by varying proximity of the inductor coil to the workpiece in such a manner that the coil will be closest to the workpiece on that side which is concave along its length, and furthest from the workpiece on that side which is convex. However, the difference of depth of the martensitic layer which is induced in the concave side as compared to the convex side may be induced by other means—for example by offsetting the quench coil or, by locally varying the distribution of the quench medium around the quench coil so that the deeper martensitic layer on one side results from prolonging the period before quenching, allowing the heat to penetrate further radially inwards, or by locally varying the distribution of the quench medium around the quench coil.

BRIEF DESCRIPTION OF THE DRAWING

In order that the invention may be better understood and put into practice a preferred form thereof is hereinafter described by way of example with reference to the accompanying drawings in which.

DESCRIPTION OF THE PREFERRED EMBODIMENTS

Figure 1:
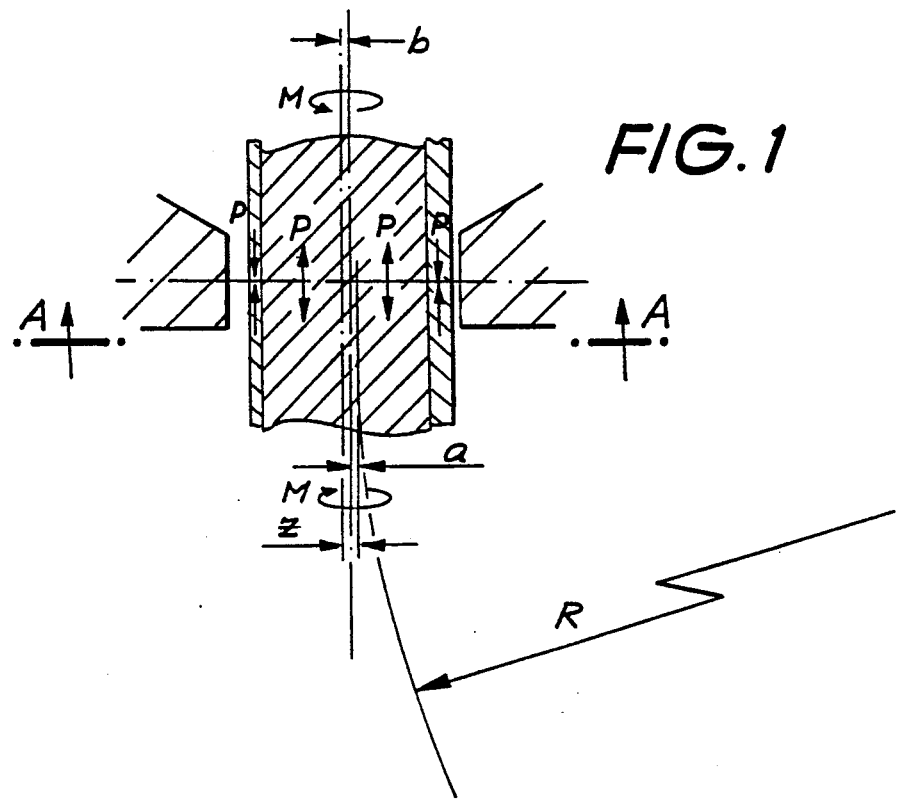
FIG. 1 shows a section in elevation of a round bar being hardened by a process according to the first invention.
Figure 2:
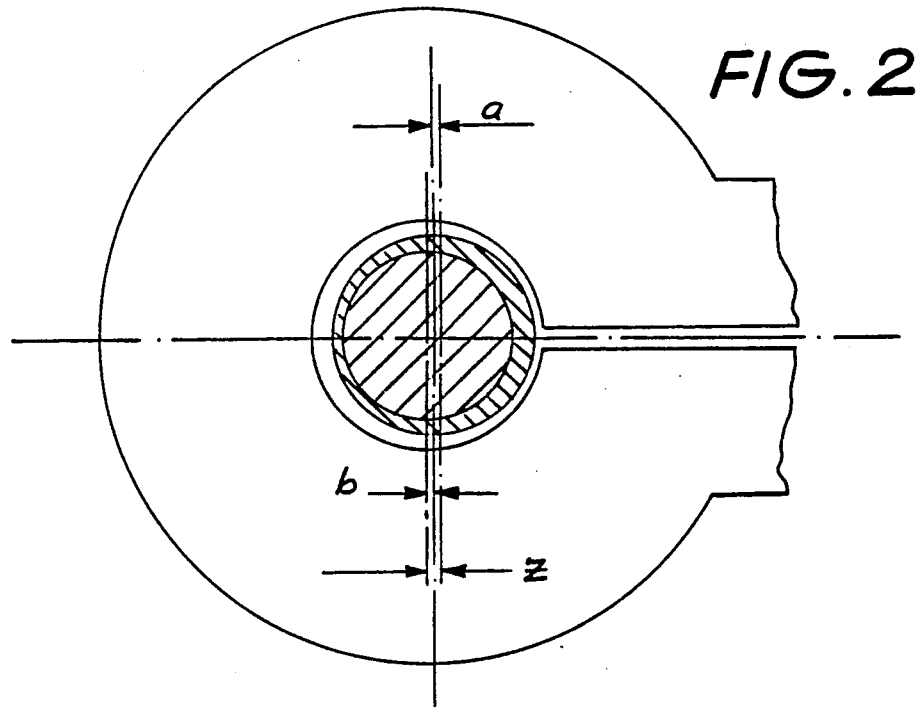
FIG. 2 is a section on line A—A of FIG. 1.

FIGS. 1 and 2 show typical sections of a round shaft hardened according to the first invention. In these drawings it is assumed that the shaft to be hardened had some initial bend of radius R which it is desired to correct. According to the invention the hardening is carried out in such a manner that the depth of the hardened case, that is, the martensitic layer, is greater on one side than the other so that its centroid is displaced from the axis of the shaft by some small amount "a". Similarly the centroid of the unhardened core is displaced in the opposite direction from the axis of the shaft by "b". Thus the lines of action of the net compressive force P in the case and the reacting net tensile force P in the core are offset by a distance "z" where z=a+b, causing a bending moment M=Pz to act on the bar.

Now the radius of curvature R of the bend in the outer layer is substantially the same as that of the bend in the core and the moment M must be distributed between the case and the core such that:

$$Ma = \frac{EIa}{R} \text{ and } Mb = \frac{EIb}{R}$$

where:

Ma = Moment on case
Mb = Moment on core
Ma + Mb = M = Pz
Ia = centroidal second moment of area of case
Ib = centroidal second moment of area of core
E = Elastic modulus of the material.
R = Radius of curvature of workpiece.

The values of Ia and Ib are clearly related to the mean depth of the hardened case, hence the magnitude of the displacement "a", and the value of R.

For the shaft initially bent to radius R, the above moment M will be such as to tend to straighten the bar, at the very least increase radius R. Similarly, if bending of radius R occurs during hardening due to the relief of stresses, displacement of the hardened layer will counteract the bending.

Figure 3:
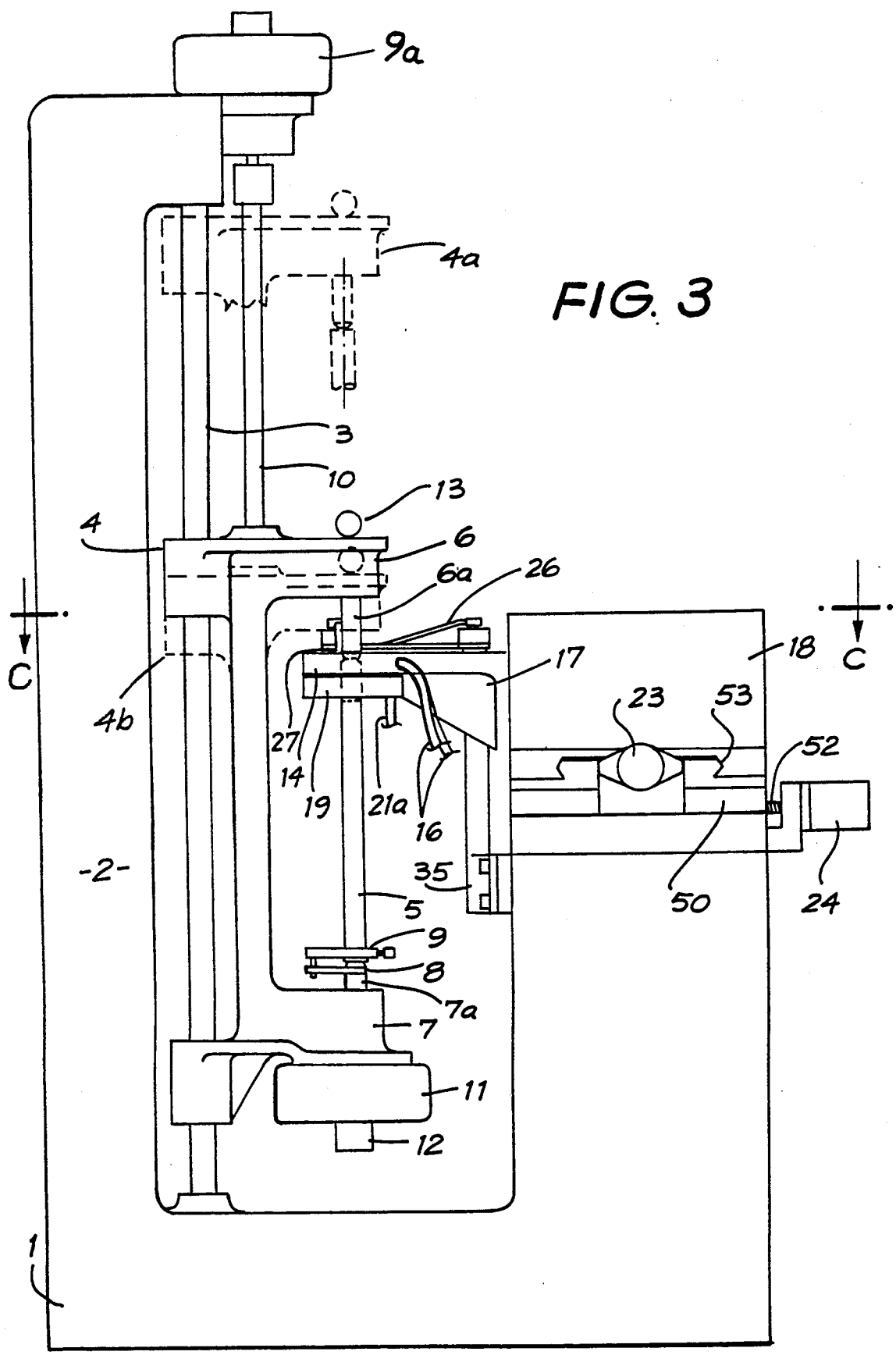
FIG. 3 is a side elevation of a machine for carrying out the process according to the first invention.

Referring to FIG. 3, this shows a side elevation of a machine made according to the present invention.

It will be seen that the machine comprises a base 1 which, together with column 2, supports slideway bars 3 arranged vertically. The slideway bars serve as guides for carriage 4 carrying at its upper end tailstock 6 and at its lower end headstock 7.

Workpiece 5 is supported on centres on the headstock and tailstock of the carriage, headstock 7 being provided with lower centre 7a and driver 8 which engage a carrier 9 secured to the workpiece. Carriage 4 is caused to travel vertically by electric motor 9a which rotates leadscrew 10, the lower end of which is journalled to carriage 4. By operation of electric motor 9a, the carriage can be caused to travel vertically as required for the hardening of the workpiece 5. Workpiece 5 may be caused to rotate during the hardening operation by motor 11, and its angular position is determined by rotary encoder 12. Alternately, where the workpiece is not circular in section the drive arrangement described may be used to ensure that the workpiece is correctly oriented with respect to the coil. The carriage 4 is capable of travelling to an extreme low position as indicated at 4b or to an extreme upper position indicated as 4a both shown dotted. In the lowest position 4b centre 6a of tailstock 6 protrudes below quench ring 19 so that centre 6a can be moved vertically upward by knob 13 to release the workpiece for the insertion of the next workpiece.

Figure 4:
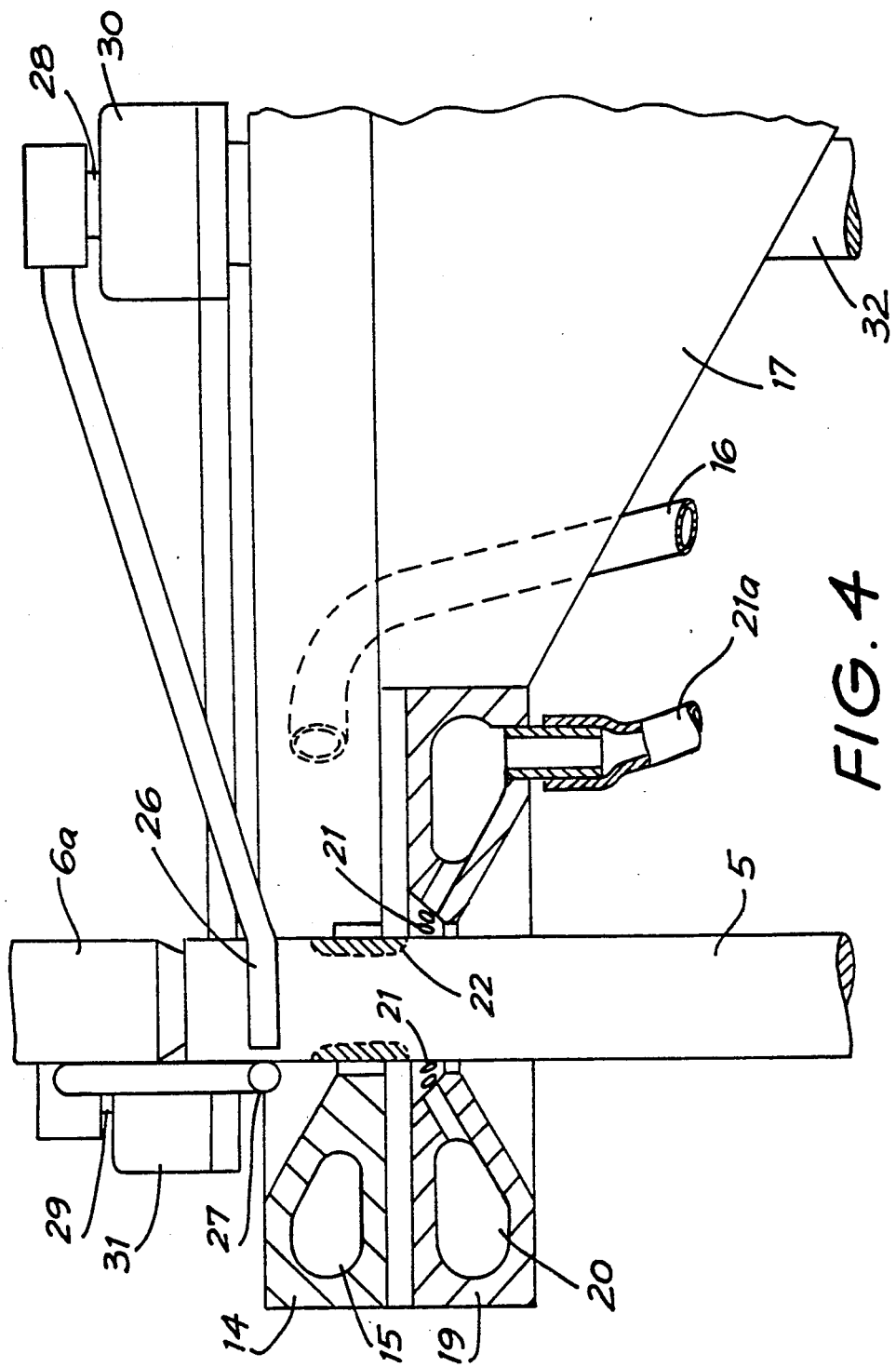
FIG. 4 is a section on line B—B of FIG. 5.

The workpiece is surrounded by an induction coil 14 shown more clearly in FIG. 4, which comprises a single turn copper conductor incorporating cooling passage 15 connected to flexible pipes 16. Induction coil 14 is mounted on bus bars 17 which extend from transformer box 18.

Immediately underneath induction coil 14 is located quench ring 19 incorporating a toroidal passage 20 from which extends radially inwardly a plurality of holes 21 for directing the quench fluid, fed from flexible pipe 21a, directly on the workpiece. In practice, when hardening a circular workpiece, the workpiece will be rotating under the action of motor 11 and simultaneously will be travelling vertically downwards through the coil and quench ring as a result of the operation of electric motor 9 and leadscrew 10. In the case of a non-circular workpiece, motor 11 is not operated.

Once transformer 18 is energised, it will cause induction coil 14 to heat the workpiece locally as indicated in FIG. 4 as 22 and shortly thereafter the quench fluid emitted by holes 21 will quench the heated zone so hardening it. Hardening then proceeds over the entire length of the workpiece or that part requiring hardening with the heating preceding the quenching for any one portion of the component.

Figure 5:
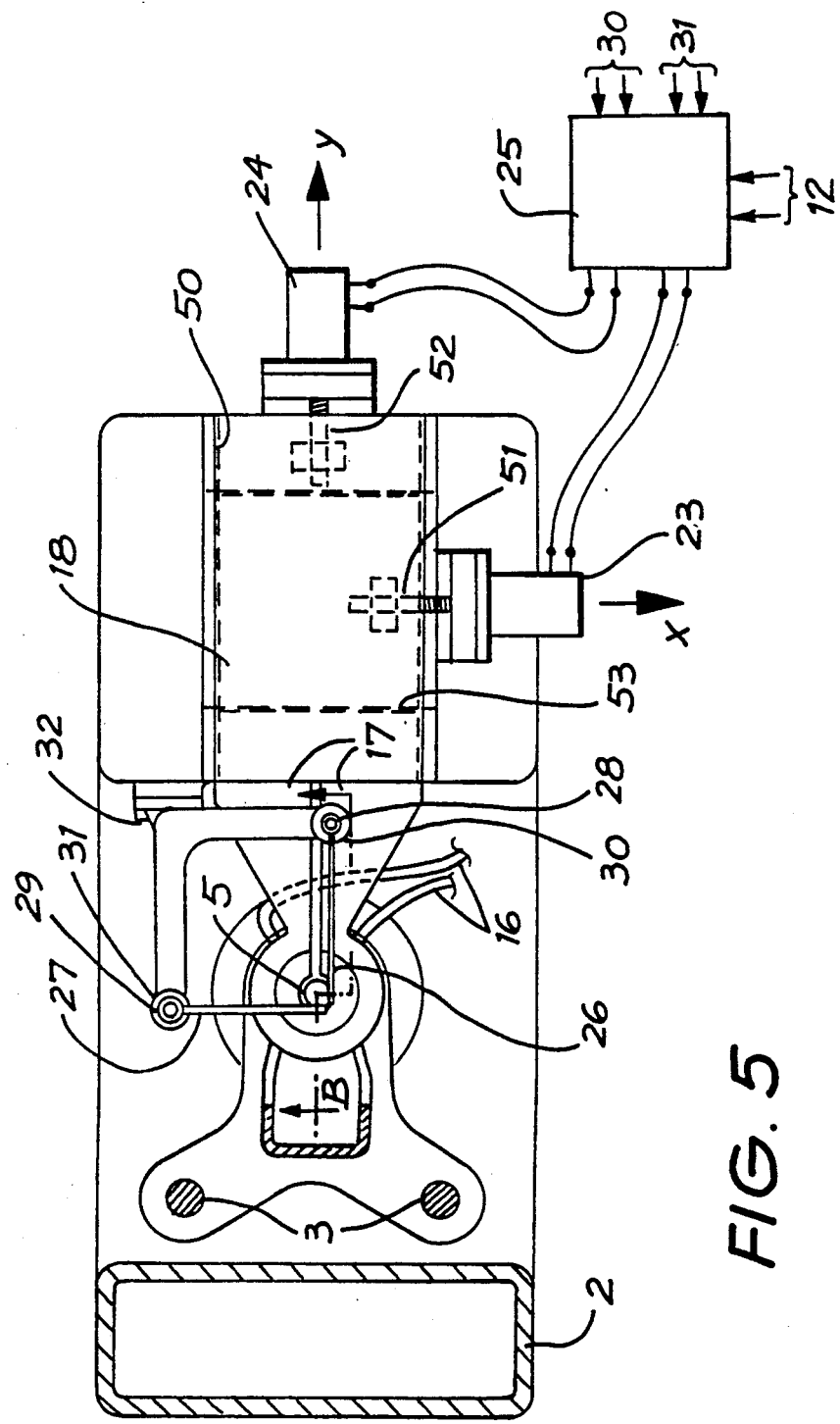
FIG. 5 is a section on line C—C of FIG. 3.

Referring now to FIG. 5, transformer box 18 which supports induction coil 14 via bus bars 17, is mounted on slideways 50 and 53 mutually at right angles to each other and driven by leadscrews 51 and 52 and servo motors 23 and 24 respectively. By these means, induction coil 14 is caused to move in any direction in a horizontal plane under the control of a suitable controller 25 which has as inputs the signals from encoders 12, 30 and 31 and outputs to servo-motors 23, 24.

In order to provide information as to the coaxiality of workpiece 5 with respect to centres 6a and 7a, two probes 26 and 27 are spring-loaded against the workpiece. These probes are attached to the output shafts 28 and 29 of rotary encoders 30 and 31 respectively, mounted on bracket 32 secured to base 1. In the case where the workpiece is circular and motor 11 is energized, only one probe is used to provide information, whereas in cases where the workpiece is non-circular and does not rotate, both are used.

Figure 6:
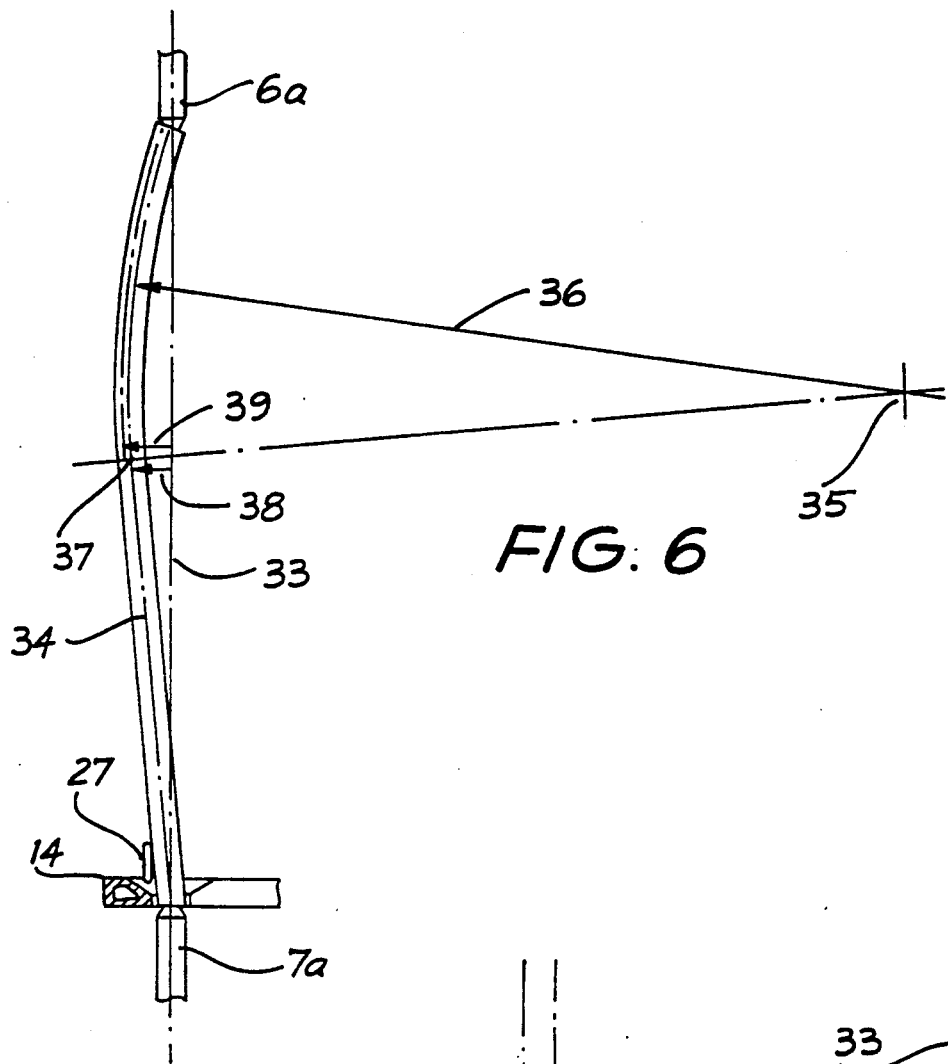
FIG. 6 illustrates an example of a workpiece having a bend of typical shape.

The exact amount of offsetting of the coil needed to correct bending which is occurring during the hardening process will depend on many factors such as the average depth of hardening required, the steel composition etc., but it will always be the case that the offsetting will move coil 14 and/or quench ring 19 so as to produce a greater depth of hardened layer on the longitudinally concave side of the workpiece. The correct degree of offsetting will, in practice, be determined by trial and error, having regard to the physical calculations outlined above.

Where the workpiece is initially bent, as shown in FIG. 6, a more elaborate method is required.

For example, if workpiece 5 is straight in its lower half, below point 37, but bent at a radius 36 having centre 35 in its upper half, its centreline 34 will orbit about the line 33 joining centres 6a and 7a as it rotates.

Induction coil 14 is here shown just commencing to harden workpiece 5 as it is carried vertically down by centres 6a and 7a. Probe 27 would be detecting a progressively increasing offset between centrelines 34 and 33. However, as the workpiece is straight up to point 37 coil 14 must exactly follow the orbiting centreline 34 so as not to induce unwanted bending.

In the present apparatus a preliminary upward movement of the workpiece 5 through the induction coil 14 is used to monitor any bends which are detected by the probes 26 and 27 and information in relation to which is transferred to the controller 25 for use during the subsequent downward movement of the workpiece 5 during which hardening is effected.

Figure 7:
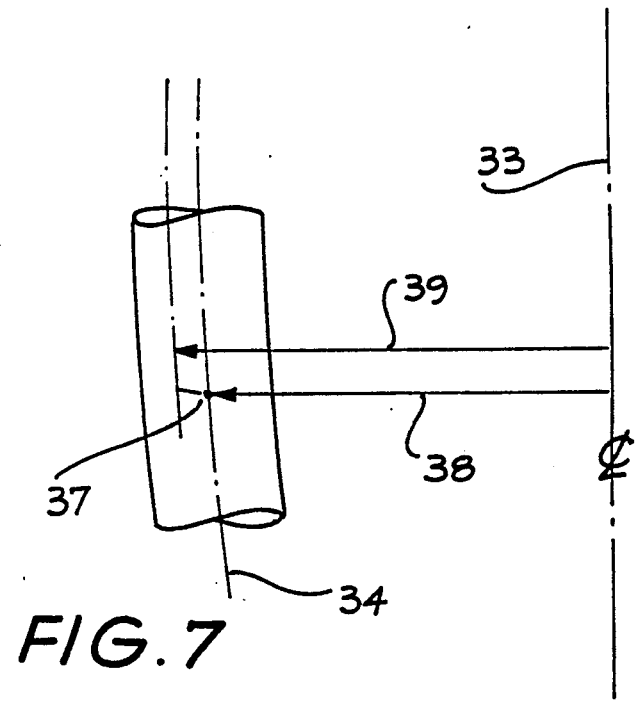
FIG. 7 shows the corrective action imparted to the coil at a particular instant of time to connect the bend shown in the workpiece of FIG. 6.

The exact offset to be anticipated at any point will have been recorded in controller 25 prior to the commencement of hardening, and if the offset detected by probe 27 differs from that recorded, due to the release of stress during hardening, the orbiting motion of induction coil 14 will be modified so as to correct such bending so maintaining centre-line 34 straight, up to point 37. At this point, the orbiting radius 38 will increase to 39 so that the induction coil 14 will now be brought closer to the longitudinally concave side of workpiece 5, as shown in FIG. 7, to such a degree that centre-line 34 above point 37 is progressively straightened.

The value of orbiting radius 39 will now constantly reduce because the length over which radius 36 applies is progressively reduced as induction coil 14 approaches centre 6a. Controller 25 is arranged to compute new values of orbiting radius 39 and probe 27 will compare their computed values with actual. In the event of a difference, due, for example, to the release of stress in the workpiece or small computational errors, the orbiting radius of induction coil 14 will be suitably changed from the initially computed values.

In practice, a workpiece may have several bends of differing radii 36 having centres 35 at differing points along the length and spaced in different planes around axis 36. If bend radius 36 is less than that which can be corrected, having regard to the maximum offsetting of the hardened layer permitted by the specifications of the workpiece, then an initial straightening operation will be required.

It is, of course, not necessary that an initial bend of a workpiece be characterized as a radius and, in most cases, a bend will be of continuously changing curvature. However, the limitation on the minimum radius, referred to above, will require that the instantaneous radius be continually computed.

In most cases, localized zones of bending of the finished workpiece can be tolerated, so that it will suffice to characterize the shape of the workpiece in terms which include larger radii than are actually present.

In the above description a circular workpiece is exampled. However, in the case of non-circular workpiece where the workpiece is not rotated during hardening, a similar procedure is used except that the two probes are used to give the necessary information to controller 25 both in respect of initial bending and that occurring while hardening proceeds.

Furthermore, as most workpieces which are induction hardened are subsequently stress relieved, a degree of over-correction of any initial or other bending may be desirable. Such stress relieving will, in general, only be such as to relieve stress peaks that otherwise might induce cracking, and hence such over-correction will, in general, be minimal.

Figure 8:
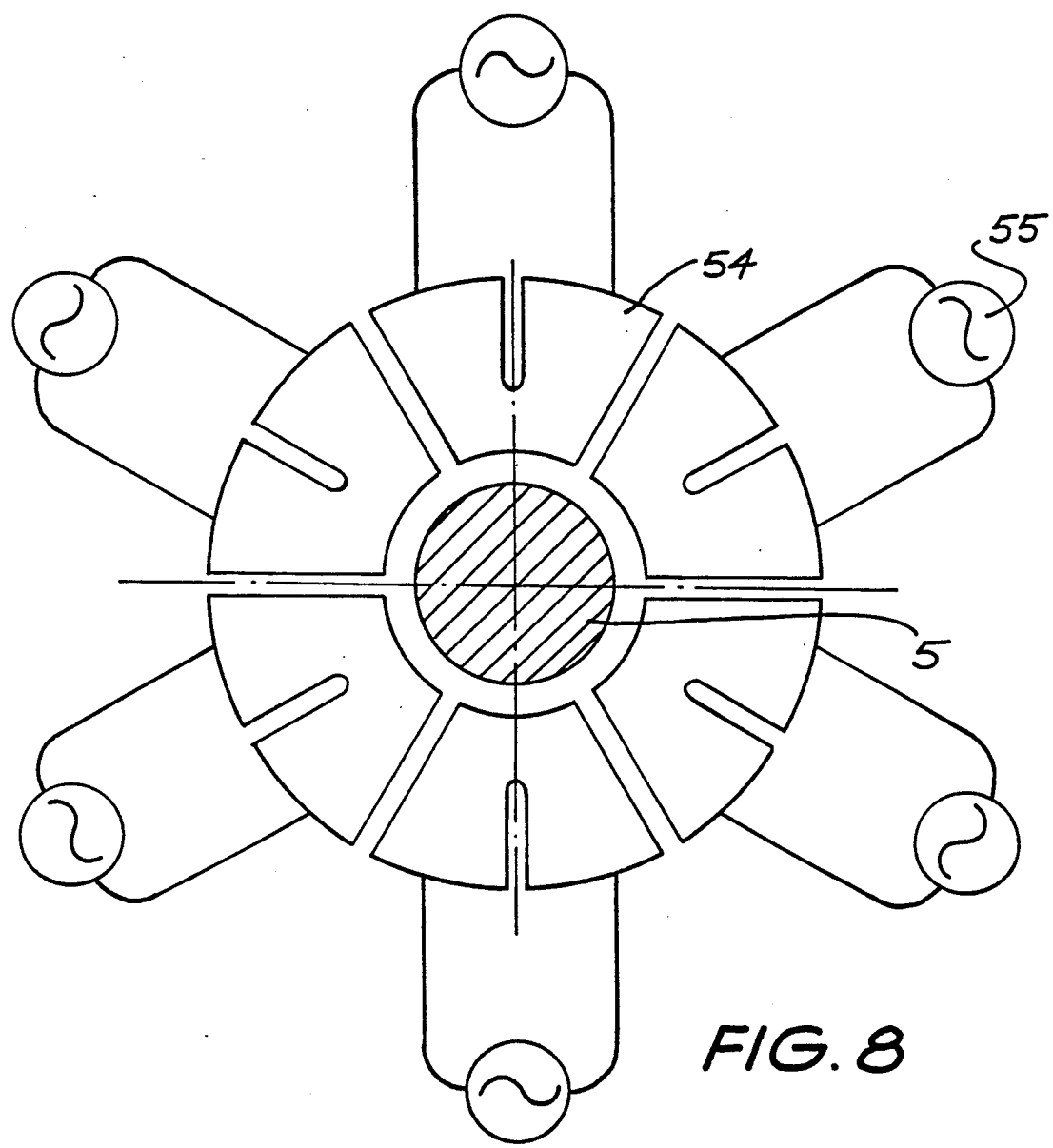
FIG. 8 shows an alternative form of inductor coil.

In an alternative form of the invention illustrated in FIG. 8, a plurality of inductor coil segments 54, surrounding some or all of the workpiece, is used and each segment is connected to a separately controllable power source 55. The power density between the segments is varied in such a manner as to produce a deeper martensitic layer on the concave side of the workpiece.

Figure 9:
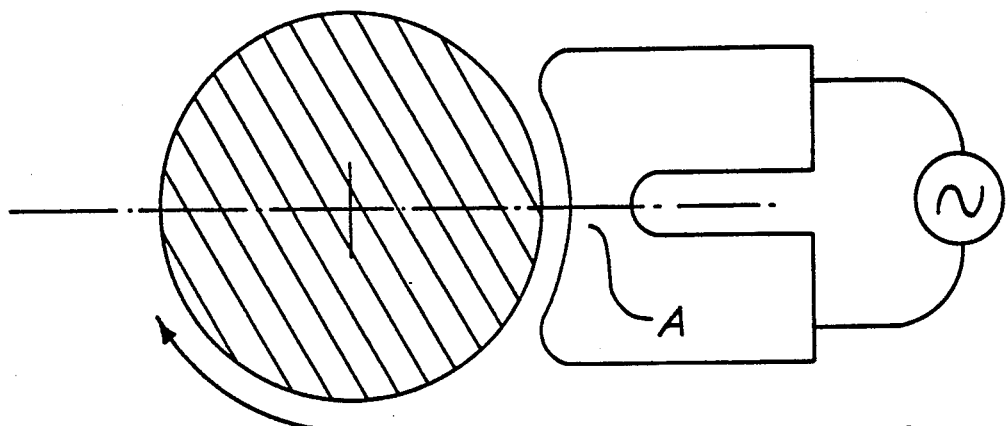
FIG. 9 is a diagrammatic illustration of a form of the present invention.
Figure 10:
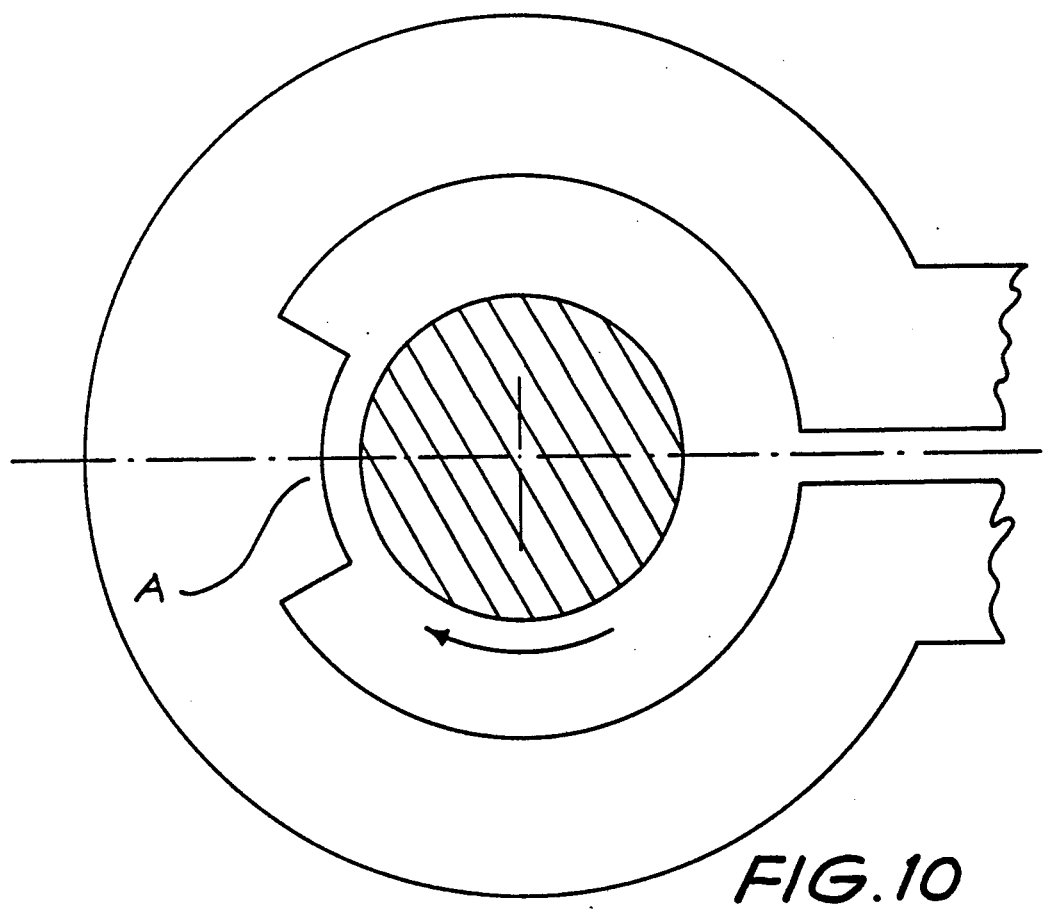
FIG. 10 is a diagrammatic illustration of a further modification of the present invention.

FIGS. 9 and 10 illustrate diagrammatically forms of the present invention. In these forms, the speed of rotation of the bar is cyclically varied, and the coil is designed to only heat one portion (as in FIG. 9) or concentrate the heat in one portion (as in FIG. 10) of the circumference. The speed of rotation of the bar is reduced as the concave side passes "A", resulting in the subsequent formation of a deeper martensitic layer on this side.

In another variation of the invention, a coil as drawn in FIG. 9 is used. The coil is able to be moved back and forth radial to the axis of the bar. This fact, coupled with the variable rotation described above, will allow non-circular section workpieces to be correctly hardened and straightened.

In another form of the first invention, all necessary motions are imparted to the workpiece and the coil remains stationary.

I claim:

1. A scanning induction hardening process in which a steel workpiece which has a circumference is surface hardened by progressively traversing the length with an inductor coil energised by an alternating electric current and immediately thereafter quenching the heated portion of the workpiece, straightening of bends in the workpiece being surface hardened being controlled during the induction hardening process by monitoring the straightness of the workpiece and utilising information thereby obtained to control the heating or quenching or both heating and quenching of the workpiece such that a layer of hardened material of greater thickness is formed on the concave side of any bend in the workpiece such as to produce a straightening moment acting to remove the bend characterised in that the inductor coil is shaped to heat only a portion of the circumference of the workpiece, or shaped to concentrate more heat in one portion of the circumference, and the speed of rotation of the workpiece is varied to allow the concave side of the workpiece to remain in the concentrated heating area longer, and thus, upon quenching, to receive a deeper martenistic layer on the concave side.

2. A scanning induction hardening process as claimed in claim 1 wherein the induction coil is controlled to move radially to the workpiece axis to control the depth of the martenistic layer on a workpiece of circular or non-circular section.

* * * * *